US010210003B2

(12) United States Patent
Ducatelle et al.

(10) Patent No.: US 10,210,003 B2
(45) Date of Patent: Feb. 19, 2019

(54) METHODS AND APPARATUS FOR MODULE ARBITRATION

(71) Applicant: NUANCE COMMUNICATIONS, INC., Burlington, MA (US)

(72) Inventors: Frederick Ducatelle, Oudenaarde (BE); Marcus Grober, Gifhorn (DE); Gaetan Martens, Zarlandinge (BE)

(73) Assignee: NUANCE COMMUNICATIONS, INC., Burlington, MA (US)

(*) Notice: Subject to any disclaimer, the term of this patent is extended or adjusted under 35 U.S.C. 154(b) by 0 days.

(21) Appl. No.: 15/509,884

(22) PCT Filed: Sep. 30, 2014

(86) PCT No.: PCT/US2014/058211
§ 371 (c)(1),
(2) Date: Mar. 9, 2017

(87) PCT Pub. No.: WO2016/053276
PCT Pub. Date: Apr. 7, 2016

(65) Prior Publication Data
US 2017/0308389 A1   Oct. 26, 2017

(51) Int. Cl.
*G10L 15/00* (2013.01)
*G06F 9/451* (2018.01)
*G06F 3/16* (2006.01)
*G10L 15/22* (2006.01)
*G10L 15/32* (2013.01)

(52) U.S. Cl.
CPC .............. *G06F 9/451* (2018.02); *G06F 3/167* (2013.01); *G10L 15/22* (2013.01); *G10L 15/32* (2013.01); *G10L 2015/223* (2013.01); *G10L 2015/228* (2013.01)

(58) Field of Classification Search
CPC .............. G06F 3/16; G06F 15/22; G06F 15/32
USPC ....................................................... 704/275
See application file for complete search history.

(56) References Cited

U.S. PATENT DOCUMENTS

| 6,098,043 | A | 8/2000 | Forest et al. |
| 6,233,559 | B1* | 5/2001 | Balakrishnan ............ G06F 3/16 704/270.1 |
| 8,831,585 | B2 | 9/2014 | Nicholson et al. |
| 9,213,659 | B2* | 12/2015 | Beaumont ........... G06F 3/04842 |
| 2003/0005174 | A1* | 1/2003 | Coffman ............... G06F 9/4443 719/318 |
| 2003/0171929 | A1 | 9/2003 | Falcon et al. |

(Continued)

FOREIGN PATENT DOCUMENTS

| EP | 2733697 A1 | 5/2014 |
| WO | WO 2016/053276 A1 | 4/2016 |

OTHER PUBLICATIONS

European Response filed on Jun. 6, 2017 to Official Communication dated May 10, 2017; for European Pat. App. No. 14903111.4.
(Continued)

*Primary Examiner* — Daniel Abebe
(74) *Attorney, Agent, or Firm* — Daly, Crowley, Mofford & Durkee LLP

(57) ABSTRACT

Methods and apparatus to process a user input on independent applications that provide classifier outputs to an arbitration module, which selects one of the application to respond to the user input. The classifier outputs include a probability that the user input is in domain for the application functionality.

18 Claims, 4 Drawing Sheets

(56) References Cited

U.S. PATENT DOCUMENTS

| | | | |
|---|---|---|---|
| 2004/0260438 A1* | 12/2004 | Chernetsky | G10L 15/22 701/36 |
| 2004/0260562 A1* | 12/2004 | Kujirai | G01C 21/3608 704/275 |
| 2005/0288936 A1* | 12/2005 | Busayapongchai | H04M 3/4936 704/275 |
| 2007/0038461 A1* | 2/2007 | Abbott | G10L 15/30 704/275 |
| 2008/0059195 A1* | 3/2008 | Brown | G06F 3/16 704/270 |
| 2013/0304473 A1* | 11/2013 | Baldwin | G06Q 30/02 704/257 |

OTHER PUBLICATIONS

PCT International Search Report and Written Opinion dated Jun. 26, 2015 for International Application No. PCT/US2014/058211; 10 Pages.

PCT International Preliminary Report dated Apr. 4, 2017 for International Application No. PCT/US2014/058211; 6 Pages.

European Communication Pursuant to Rules 161(2) and 162 EPC dated May 10, 2017; for European Patent Application No. 14903111.4; 2 pages.

Extended European Search Report dated Apr. 6, 2018 for European Application No. 14903111.4; 8 Pages.

Heck et al., "Exploiting the Semantic Web for Unsupervised Spoken Language Understanding;" IEEE Spoken Language Technology Workshop; Dec. 2, 2012; 6 Pages.

Lane et al., "Topic Classification and Verification Modeling for Out-of-Domain Utterance Detection;" Proceedings of $8^{th}$ International Conference on Spoken Language Processing (INTERSPEECH 2004—ICSLP); Oct. 4, 2004; 4 Pages.

Tur et al., "Detecting Out-of-Domain Utterances Addressed to a Virtual Personal Assistant;" Proceedings of INTERSPEECH 2014; Sep. 14, 2014; 5 Pages.

* cited by examiner

METHODS AND APPARATUS FOR MODULE ARBITRATION

CROSS REFERENCE TO RELATED APPLICATIONS

This application is a National Stage application of PCT/US2014/058211 filed on Sep. 30, 2014, and entitled "Methods And Apparatus For Module Arbitration", which is incorporated herein by reference.

BACKGROUND

As is known in the art, in some systems a single speech recognition UI system can process user utterances for a number of applications. An arbitration module can select one of the applications to respond to the user utterance. In conventional systems, a multi-class classifier performs arbitration for the various applications. However, such a multi-class classifier is trained for known applications. Thus, the multi-class classifier it not readily extensible for independently developed applications.

SUMMARY

Embodiments of the invention provide methods and apparatus for a single user interface (UI) system having multiple modules, where each module implements a subset of the UI functionality of the full system. A module typically corresponds to an application supported by the system. At runtime, arbitration is applied by one arbitration system that analyzes the request passed to the UI system by a user, and depending on the requested functionality, the UI system passes control to the relevant module(s). Embodiments of the invention are directed to UI systems based on speech recognition, where user inputs are voice commands, but it could also be used for other UI systems that deal with possibly ambiguous input.

In general, modules operate independently from each other and can be developed independently from each other so that the framework is readily extensible with other modules without the need to change existing modules or to change the arbitration system. Embodiments of the invention provide a UI system from an undefined number of independently developed UI modules to which control can be given.

In illustrative embodiments, the user input to the UI system is passed to the respective modules, possibly after some first processing (e.g., applying automated speech recognition on an audio utterance). Each module outputs a probability to express a level of relevance the input has to the functionality of the respective module. The modules operate independently and provide input to an arbitration module, which can process input from any practical number of modules. The role of the arbitration module is to gather the output of the respective modules, and propose one or more of them as the ones that should be allowed to process the command from the user.

Embodiments of the invention are applicable to various applications where an extensible framework is desirable, such as connecting different devices that contain one or more speech-enabled applications to a head unit in a car, for example, and/or integrated systems that allow different ASR/NLU technologies to share a single microphone in a system. Further applications include an extensible system that provides an ASR/NLU system that is extensible with other modules downloaded and executed on different devices. It is understood that the modules do not need to reside on different devices. Also on a single device, with the provided flexibility, modules can be developed at different points in time and by independent teams, they can be chosen and combined freely by the user, etc.

In one aspect of the invention, a method comprises: receiving, in response to a user utterance, a first input from a first classifier of a first application, the first input including a probability of at least a portion of the user utterance being in domain for the first application, wherein in domain for the first application means that the first application contains the functionality required to respond to the utterance; receiving, in response to the user utterance, a second input from a second classifier of a second application, the second input including a probability of at least a portion of the user utterance being in domain for the second application; and performing arbitration on the user utterance using the first and second inputs to prioritize a first one of the first and second applications for responding to the user utterance.

The method can further include one or more of the following features: performing automated speech recognition (ASR) on the user utterance by an ASR module in the first application specific to the first application and generating a first n-best list for the user utterance, processing the first n-best list by the first classifier in the first application, the arbitration is performed by an arbitration module on a head unit of a vehicle, the first application is located on the vehicle and the second application is located on a mobile phone wirelessly connected to the head unit, the first classifier and the second classifier were trained using a reference dataset, the first classifier includes an in domain/out of domain classifier trained using input data relevant to the first application for the in domain data and input data that is not relevant to the first application for out of domain data, where the latter is extracted from the reference dataset, the first and second applications were independently developed, but using the same reference dataset to obtain out of domain data for training, and/or the first classifier receives a feature set as input derived from the user utterance.

In another aspect of the invention, an article comprises: a non-transitory computer readable storage medium having stored instructions that enable a machine to: receive, in response to a user utterance, a first input from a first classifier of a first application, the first input including a probability of at least a portion of the user utterance being in domain for the first application, wherein in domain for the first application refers to functionality provided by the first application; receive, in response to the user utterance, a second input from a second classifier of a second application, the second input including a probability of at least a portion of the user utterance being in domain for the second application; and perform arbitration on the user utterance using the first and second inputs to prioritize a first one of the first and second applications for responding to the user utterance.

The article can further include one or more of the following features: performing automated speech recognition (ASR) on the user utterance by an ASR module in the first application specific to the first application and generating a first n-best list for the user utterance, processing the first n-best list by the first classifier in the first application, the arbitration is performed by an arbitration module on a head unit of a vehicle, the first application is located on the vehicle and the second application is located on a mobile phone wirelessly connected to the head unit, the first classifier and the second classifier were trained using a reference dataset, the first classifier includes an in domain/out of domain classifier trained using input data relevant to the first application for the in domain data and input data that is not relevant to the first application for out of domain data, where the latter is extracted from the reference dataset, the first and second applications were independently developed, but using the same reference dataset to obtain out of domain data, and/or the first classifier receives a feature set as input derived from the user utterance.

In a further aspect of the invention, a system comprises: an interface to communicate with first and second applications; an arbitration means coupled to the interface, the arbitration means to arbitrate on a user utterance from a user based on a first input from a first application in response to the user utterance and a second input from a second application in response to the user utterance, wherein the first input is received from a first classifier of the first application, the first input including a probability of at least a portion of the user utterance being in domain for the first application, wherein in domain for the first application corresponds to functionality provided by the first application, and wherein the second input is received from a second classifier of the second application, the second input including a probability of at least a portion of the user utterance being in domain for the second application, the arbitration means to prioritize a first one of the first and second applications for responding to the user utterance.

The system can further include one or more of the following features: automated speech recognition (ASR) performed on the user utterance by an ASR module in the first application specific to the first application and generating a first n-best list for the user utterance, the first n-best list processed by the first classifier in the first application, the arbitration performed by an arbitration module on a head unit of a vehicle, the first application located on the vehicle and the second application located on a mobile phone wirelessly connected to the head unit, the first classifier and the second classifier trained using a reference dataset, the first classifier including an in domain/out of domain classifier trained using input data relevant to the first application for the in domain data and input data that is not relevant to the first application for out of domain data, where the latter is extracted from the reference dataset, the first and second applications were independently developed, but using the same reference dataset to obtain out of domain data, and/or the first classifier receives a feature set as input derived from the user utterance.

BRIEF DESCRIPTION OF THE DRAWINGS

The foregoing features of this invention, as well as the invention itself, may be more fully understood from the following description of the drawings in which.

DETAILED DESCRIPTION

Figure 1:
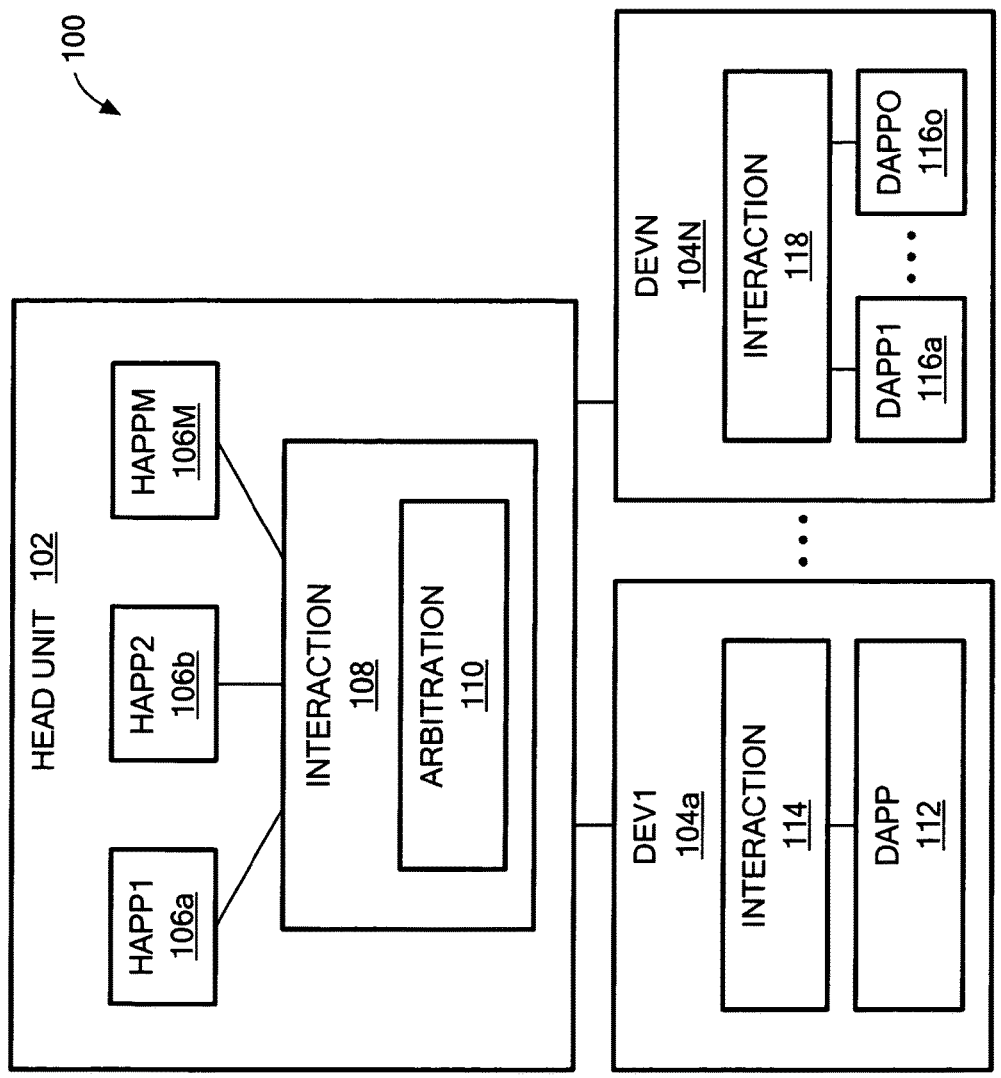
FIG. 1 is a schematic representation of a system having module extensible arbitration.

FIG. 1 shows a system 100 including an automobile head unit 102 in communication with a number of devices 104a-N. The head unit 102 includes a number of applications 106a-M, such as a phone application 106a, a navigation application 106b, and an entertainment application 106N. It is understood that a wide variety of applications 106 can be provided on an automobile head unit 102. The applications 106 are coupled to an interaction module 108, which includes an arbitration module 110.

A first device 104a, such as a mobile phone, includes an application 112, such as a social media application, coupled to an interaction module 114. A second device 104N, such as a tablet computer, includes a number of applications 116a-O, such as a navigation application and a SMS application, coupled to an interaction module 118.

As described more fully, below, the arbitration module 110 determines which application on the head unit 102 or devices 104 should respond to a user voice command, for example, from a passenger in the vehicle. The arbitration may also determine that multiple applications can respond to the user voice command. In this case, its role is to determine the relative relevance of each application.

While illustrative embodiments of the invention are shown and described in conjunction with an automobile head unit, it is understood that embodiments of the invention are applicable to any system having various applications for which arbitration is desirable.

Figure 2:
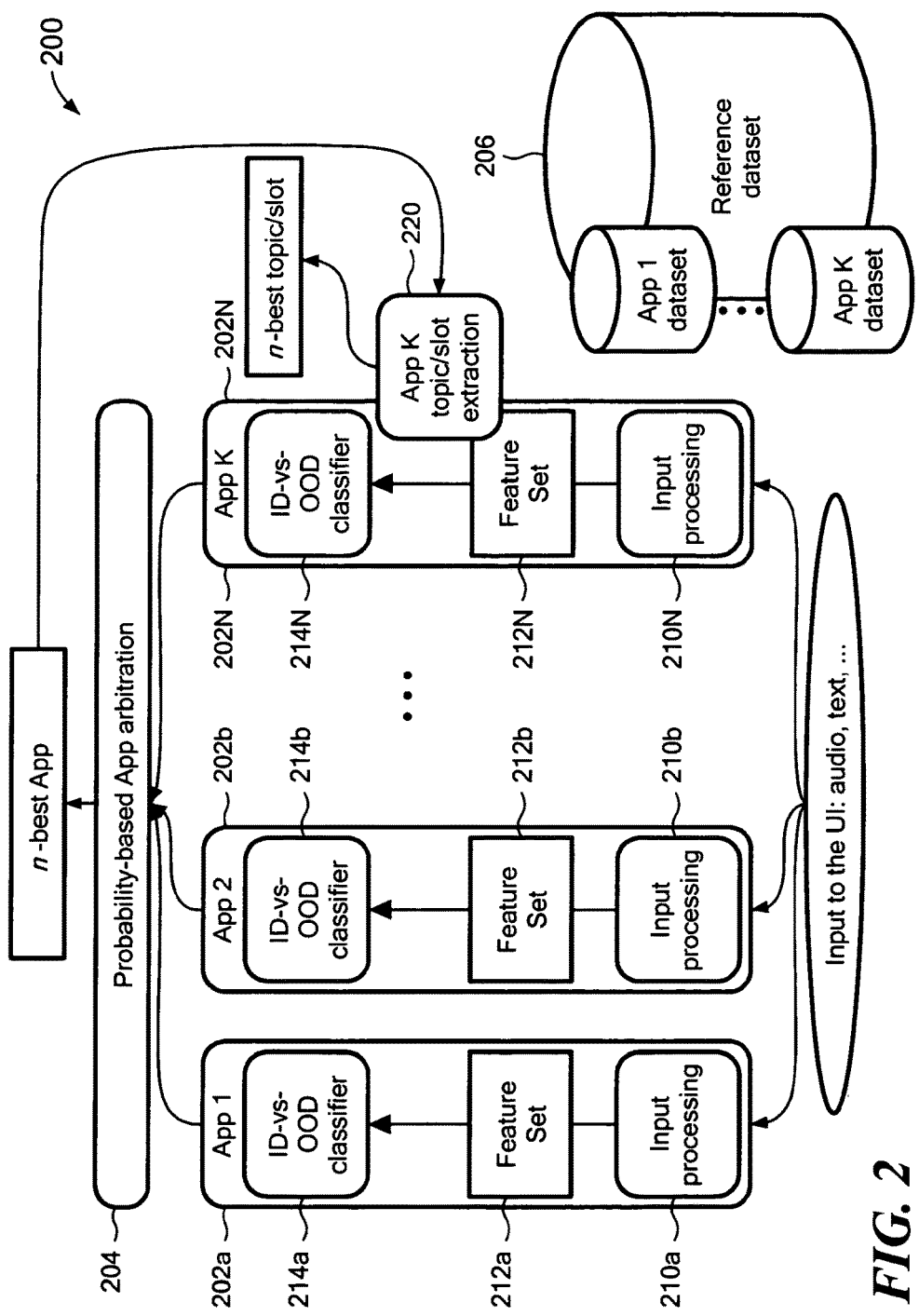
FIG. 2 is a schematic representation showing further detail of a system having module extensible arbitration.

FIG. 2 shows a system 200 having a number of modules 202a-N implementing a subset of the user interface (UI) functionality. In embodiments, each of the modules 202 corresponds to an application supported by the system. Examples could be a module supporting navigation functionality (voice controlled navigation), a module supporting phone functionality (voice aided dialing), and a module supporting control of a music player. The modules 202 can be provided on a vehicle head unit or connected device. At runtime, arbitration is provided by a single arbitration module 204 that analyzes a request passed to the UI system by a user. Depending upon the requested functionality, the arbitration module 204 passes control to the relevant module(s).

Each of the applications 202 provides different functionality, e.g., mobile phone, navigation, weather, music, from the vehicle head unit or a connected (or unconnected) device. It is understood that devices can coupled to the vehicle head unit using any suitable communication protocol, such as BLUETOOTH. In general, head unit and connected applications use microphones and loudspeakers of the vehicle. In embodiments, the arbitration module 204 resides on the vehicle head end but can be located at any practical local or remote location.

In embodiments, the modules 202 operate independently from each other. In general, the modules 202 can be developed independently from each other to provide a readily extensible framework without changing existing modules or the arbitration system 204. Embodiments of the invention provide an UI system from an undefined number of independently developed UI modules and assigns control to the 'correct' module(s), as described more fully below.

Each of the modules 202 takes input of the same commonly defined format. Typically, in a voice UI system this will be an audio command of the user to the system (e.g., "play song X"). It could however also be a different format. For example, one can first place an ASR module, which transforms the audio command to a text command and is common to all modules, and then use this as input to the different modules.

Each of the modules 202 includes functionality to provide an output to the arbitration module 204. This output format is a single number, which indicates the probability that received input is relevant to the current module, e.g., that the module possesses the required functionality to respond to the received UI command. This probability is comparable over the different modules, as explained more fully below. This comparability enables operation of the arbitration module 204.

In one embodiment, the functionality present in each module 202 includes a respective input processing module 210a-N and respective ID-vs-OOD classifier module 241a-N. Input processing 210 analyzes the input and derives from it a feature set 212a-N. In case the input is in the form of audio commands, such input processing would normally take the form of an ASR system. The feature set which forms the output of such a system can include a vector of numbers or Boolean values, for example, indicating:

- Whether or not certain keywords relevant to the module were recognized in the audio signal (e.g., for a navigation module, the input processor may search for words like "drive", "navigate", etc.)
- What is the confidence score that the ASR system attributes to this recognition (how certain is it to have recognized the sentence successfully).
- What is the language model score of the command recognized by the ASR system (what is the probability of a command containing these words in this order).

The terms recognition confidence, language model score, and feature set are well known in the art. The practice of calculating a feature set based on an input signal as input for a classifier is also well known in the art.

The ID-vs-OOD classifier 214 takes as input the feature set 212, and produces a probability that the received input signal (which was processed to obtain the feature set) is relevant to the current module. We refer to this probability as $P(App_a|S)$, where $App_a$ is the current module, and S is the input signal. Note that a classifier is used in the illustrative embodiment that produces a posterior probability estimate as output. Examples known in the art are logistic regression or neural networks. Other such classifiers can be found in the literature related to this field and are readily understood by one of ordinary skill in the art. The input format accepted by the classifier can be quite free depending upon the needs of a particular application. It should be noted that the output produced by the input processing (the feature set) conforms with the type of input expected by the classifier.

One aspect of embodiments of the invention is that the output (the probability) of the classifier 214 of each module 202 is directly comparable to that of other classifiers. This is obtained through the training of the classifier 214. The training is a process in which the classifier 214 is adapted to the specific use case, by using a training process and a training dataset. The training process depends on the kind of classifier that is chosen; any suitable technique known in the art can be used. The training dataset, on the other hand, makes the output of the classifiers 214 comparable.

The training dataset to be used to train the ID-vs-OOD classifier 214a of module 202a should contain examples of input data that are relevant to the module, which we refer to as In-Domain (ID) data, and input that that are not relevant to the modules, which we refer to as Out-Of-Domain (OOD) data. If we assume that module 202a supports music functionality, ID data refer to commands related to the music functionality supported by the module, e.g., "Play song X", or "Switch off the radio," while OOD data can be anything, from "Navigate to LA" to "What's the weather like tomorrow?" In an embodiment, each module 202 should be associated with a set of ID data, a broad and general set of examples of input that are relevant to the module.

To explain how we make the output probability of each classifier comparable, we first consider a conventional integrated system, which is not modular (where it is not needed that modules can be developed individually and combined freely). In this case, one would train a single multi-class classifier, which has N outputs, one for each module, where each output would correspond to the posterior probability of one module, e.g., $P(App_a|S)$. Classifiers for such multi-class classification and training for them are known in the art. The training dataset of such classifier would correspond to the conjunction of ID data for all N modules.

As a first step towards modularity in accordance with embodiments of the invention, we can change this approach into training N classifiers, one for each class, with a single output $P(App_a|S)$. The output of this classifier 214a indicates the posterior probability of one module 202a. We refer to such single output classifier 214a as a binary classifier. In this case the binary classifier 214a is trained with its own ID data labeled as ID, and the data of all other modules 202b-N as OOD.

Now we consider the fully modular system targeted by this invention, in which modules are developed independently and combined freely. During the development of a module $App_a$ one cannot easily compose a good training dataset with ID and OOD data, where the OOD data are the conjunction of all ID data of all other modules. While the ID of $App_a$ are known, the ID data of all other modules are normally not known. This is because modules are developed independently and will also be put together independently at runtime. This means that we do not know the OOD part of the dataset, and we also do not know its size. To address this, illustrative embodiments include the following:

- We use a reference dataset (206). This dataset contains a wide variety of examples of input data. It is should be as broad as possible, and generally represent input that may be given to the system. Whenever we train a classifier for a new module $App_a$ we use as OOD data any sentence of the reference dataset that is not relevant to modules $App_a$. This reference dataset is the common point of reference that ties together the training processes of different modules.
- We train with a fixed proportion of ID data and OOD data. This proportion can be chosen freely, but it should be the same for all modules, e.g., 25% ID data.

The arbitration module 204 produces an arbitration decision by comparing the probabilities that were calculated by each module 202 including the binary ID-vs-OOD and ID probability. New applications can be readily added since the classifier for the new module can generate output in a format that is comparable to the other modules.

In general, the arbitration module 204 can receive input from any practical number of application modules 202. In addition, weights can be generated to modulate the behavior of the arbitration module 204, such as favoring certain modules over others. Such weights can reflect user preferences, learning results, training, and the like, taken alone or in combination.

Subsequent to arbitration, a chosen module 202 can also perform additional classification tasks that are specific to the module, for example, "play My Way by Frank Sinatra" may involve a topic/slot extraction 220 to play (topic) a particular song (slot) by a particular artist (slot). This task is specific to each module, and is independent from arbitration. This means that it can be trained using only ID data, which is available during the independent development of a single module $App_a$. Any algorithm for topic/slot extraction known in the art can be used at this point.

If topic/slot extraction is done using a classifier that estimates posterior probabilities (like described for ID vs OOD classification), we can refer to its output as $P(I|App_a, S)$, where I refers to a combination of topic and slots. This probability is dependent on the input signal S, and the module $App_a$, because topic/slot extraction is specific to a module. In this case, one can calculate a probability of a topic/slot combination that is comparable over all modules, as $P(I|App_a,S)P(App_a|S)$ (where we assume that a given topic/slot combination is only possible within one module).

Figure 3:
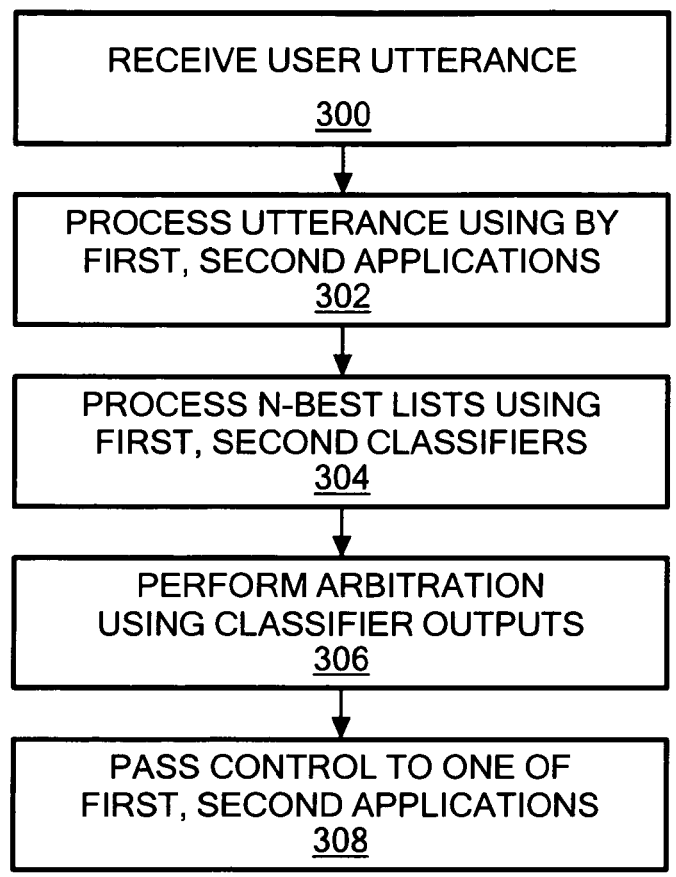
FIG. 3 is a flow diagram showing an illustrative sequence of steps for module extensible arbitration.

FIG. 3 shows an illustrative sequence of steps for providing arbitration between independent pluggable modules. In step 300, an input is received, such as a user utterance. In step 302, first and second modules process the user utterance using ASR generate respective n-best outputs, which form the feature sets that serve as input to their respective classifiers. In step 304, a first classifier for the first module processes the first n-best list and a second classifier in the second module processes the second n-best list. The classifiers output probabilities. In step 306, an arbitration module processes the outputs from the first and second classifiers. In step 308, the arbitration module assigns one of the first and second modules to respond to the user utterance.

It is understood that the illustrative steps described above can include various types of inputs from which a feature set can be generated and used by an ID-OOD classifier.

It is understood that the term application as used herein refers to a set of functionalities. Normally, such set of functionalities will be somehow related, e.g. because they refer to the same physical device (e.g., a "phone" application), or because they refer to semantically related concepts. Nevertheless, in principle, they can also refer to a more random combination of functionalities (e.g., an application covering both "phone" and "navigation" related functionality). Also, applications do not need to be mutually exclusive: there can be overlap in the functionality they support. Such flexible definition of the term application ensures a broad applicability of this system.

Figure 4:
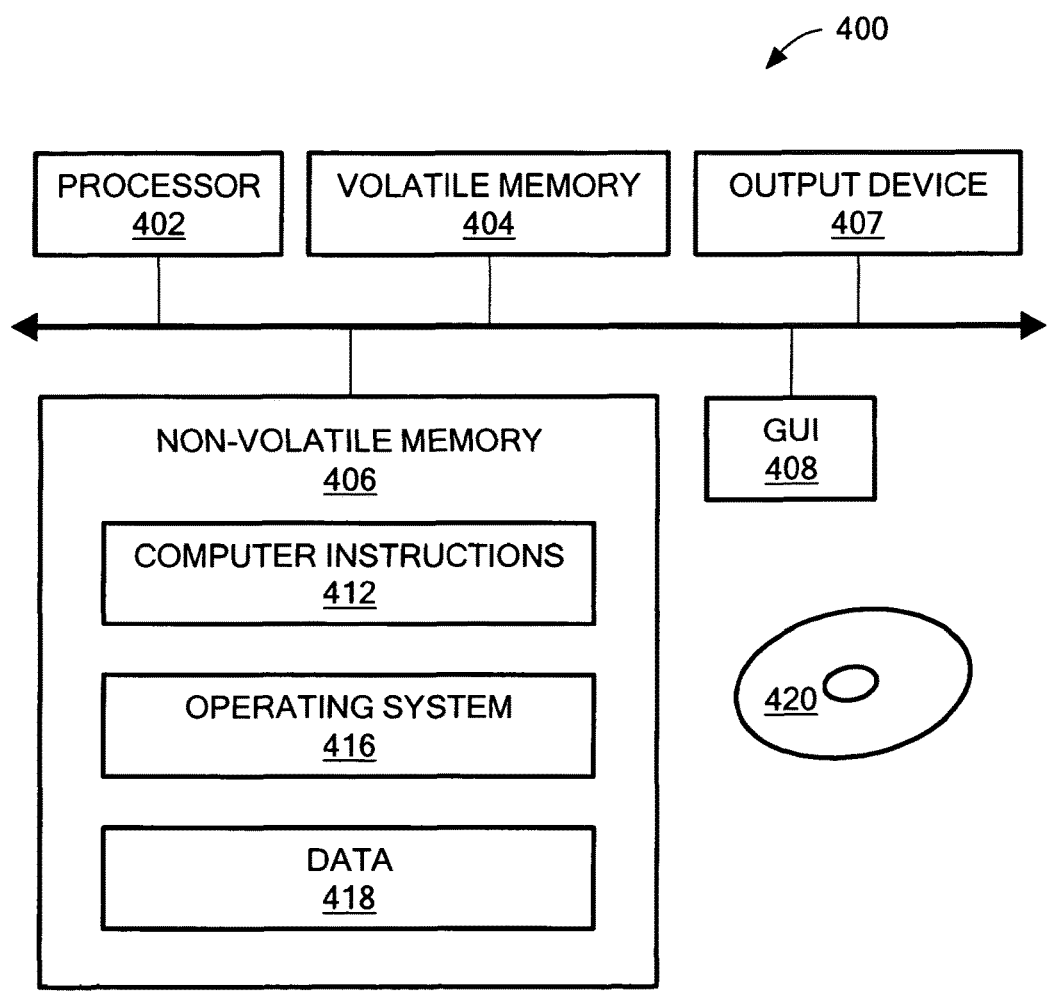
FIG. 4 is a schematic representation of an illustrative computer that can perform at least a portion of the processing described herein.

FIG. 4 shows an exemplary computer 400 that can perform at least part of the processing described herein. The computer 400 includes a processor 402, a volatile memory 404, a non-volatile memory 406 (e.g., hard disk), an output device 407 and a graphical user interface (GUI) 408 (e.g., a mouse, a keyboard, a display, for example). The non-volatile memory 406 stores computer instructions 412, an operating system 416 and data 418. In one example, the computer instructions 412 are executed by the processor 402 out of volatile memory 404. In one embodiment, an article 420 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising
receiving, in a first device in response to a user input, a first input from a first classifier of a first application executing in the first device, the first classifier having been trained using an application-independent vocabulary, the first input including a probability of at least a portion of the user input being in domain for the first application, wherein in domain for the first application refers to functionality provided by the first application using a first subset of the application-independent vocabulary;
receiving, in the first device in response to the user input, a second input from a second classifier of a second application executing in a second device, the second classifier having been trained using the application-independent vocabulary, the second input including a probability of at least a portion of the user input being in domain for the second application, wherein in domain for the second application refers to functionality provided by the second application using a second subset of the application-independent vocabulary; and
performing, in the first device, arbitration on the user input using the first and second inputs to prioritize a first one of the first and second applications for responding to the user input.

2. The method according to claim 1, further including performing automated speech recognition (ASR) on the user input by an ASR module in the first application specific to the first application and generating a first feature list for the user input.

3. The method according to claim 2, further including processing the first feature list by the first classifier in the first application.

4. The method according to claim 1, wherein the first device comprises a head unit of a vehicle.

5. The method according to claim 4, wherein the second device comprises a mobile phone wirelessly connected to the head unit.

6. The method according to claim 1, wherein the first classifier includes an in domain/out of domain classifier trained using input data relevant to the first application for the in domain data and input data that is not relevant to the first application for out of domain data.

7. The method according to claim 1, wherein the first and second applications were independently developed.

8. The method according to claim 1, wherein the first classifier receives a feature set as input derived from the user input.

9. An article, comprising:
a non-transitory computer readable storage medium having stored instructions that enable a first device to:
receive, in response to a user input, a first input from a first classifier of a first application executing in the first device, the first classifier having been trained using an application-independent vocabulary, the first input including a probability of at least a portion of the user input being in domain for the first application, wherein in domain for the first application refers to functionality provided by the first application using a first subset of the application-independent vocabulary;
receive, in response to the user input, a second input from a second classifier of a second application executing in a second device, the second classifier having been trained using the application-independent vocabulary, the second input including a probability of at least a portion of the user input being in domain for the second application, wherein in domain for the second application refers to functionality provided by the second application using a second subset of the application-independent vocabulary; and
perform arbitration on the user input using the first and second inputs to prioritize a first one of the first and second applications for responding to the user input.

10. The article according to claim 9, wherein the first device comprises a head unit of a vehicle.

11. The article according to claim 10, wherein the second device comprises a mobile phone wirelessly connected to the head unit.

12. The article according to claim 9, wherein the first classifier includes an in domain/out of domain classifier trained using input data relevant to the first application for the in domain data and input data that is not relevant to the first application for out of domain data.

13. The article according to claim 9, wherein the first and second applications were independently developed.

14. The article according to claim 9, wherein the first classifier receives a feature set as input derived from the user input.

15. A system, comprising:
an interface to communicate with first and second applications; and
an arbitration means coupled to the interface, the arbitration means to arbitrate on a user input from a user based on a first input from a first classifier of a first application executing in a first device and a second input from a second classifier of a second application executing in a second, the arbitration means to prioritize a first one of the first and second applications for responding to the user input, the first and second classifiers having been trained using an application-independent vocabulary,
the first input including a probability of at least a portion of the user input being in domain for the first application, wherein in domain for the first application corresponds to functionality provided by the first application using a first subset of the application-independent vocabulary, and
the second input including a probability of at least a portion of the user input being in domain for the second application, wherein in domain for the second application corresponds to functionality provided by the second application using a second subset of the application-independent vocabulary.

16. The system according to claim 15, wherein the first device comprises a vehicle head unit and the second device comprises a device wirelessly connected to the head unit.

17. The system according to claim 15, wherein the first classifier includes an in domain/out of domain classifier trained using input data relevant to the first application for the in domain data and input data that is not relevant to the first application for out of domain data.

18. The system according to claim 15, wherein the first classifier receives a feature set from an automated speech recognition module as input derived from the user input.

* * * * *